(12) United States Patent
Zuo

(10) Patent No.: US 7,837,487 B2
(45) Date of Patent: Nov. 23, 2010

(54) CARD SOCKET ASSEMBLY

(75) Inventor: Zhou-Quan Zuo, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/506,344

(22) Filed: Jul. 21, 2009

(65) Prior Publication Data

US 2010/0055948 A1 Mar. 4, 2010

(30) Foreign Application Priority Data

Sep. 1, 2008 (CN) .................. 2008 1 0304328

(51) Int. Cl.
*H01R 13/62* (2006.01)

(52) U.S. Cl. ..................................... 439/159

(58) Field of Classification Search ......... 439/152–160, 439/630
See application file for complete search history.

(56) References Cited

U.S. PATENT DOCUMENTS

| | | | |
|---|---|---|---|
| 6,712,627 B2* | 3/2004 | Murnaghan et al. | 439/159 |
| 7,021,948 B2* | 4/2006 | Lin | 439/159 |
| 2006/0234536 A1* | 10/2006 | Kuan et al. | 439/159 |
| 2007/0087600 A1* | 4/2007 | Chen et al. | 439/159 |

* cited by examiner

*Primary Examiner*—Javaid Nasri
(74) *Attorney, Agent, or Firm*—Steven M. Reiss

(57) ABSTRACT

A card socket assembly used to mount a data card includes a body member, and a controlling member. The body member defines a battery receiving space and a card slot adjacent to the battery receiving space. The card slot is used to receive the data card. The controlling member is used to abut against the data card, thus ejecting the data card out of the card slot.

20 Claims, 5 Drawing Sheets

CARD SOCKET ASSEMBLY

BACKGROUND

1. Technical Field

The present disclosure relates to card socket assemblies and, particularly, to a card socket assembly used in a portable electronic device, e.g., mobile phone, personal digital assistant (PDA), palm computer and etc.

2. Description of Related Art

With the development of wireless technology, portable electronic devices are becoming smaller and multifunctional. A portable electronic device usually includes a data card, e.g., a subscriber identity module (SIM) card used to store personal information and a card socket used to secure the data card.

A typical card socket assembly is usually disposed on a bottom wall of a battery receiving cavity. As such, the card socket assembly may increase the thickness of a portable electronic device incorporated with such type card socket assembly.

Therefore, there is room for improvement within the art.

BRIEF DESCRIPTION OF THE DRAWINGS

Many aspects of a card socket assembly can be better understood with reference to the following drawings. These drawings are not necessarily drawn to scale, the emphasis instead being placed upon clearly illustrating the principles of the present card socket assembly. Moreover, in the drawings like reference numerals designate corresponding sections throughout the several views.

DETAILED DESCRIPTION

Figure 1:
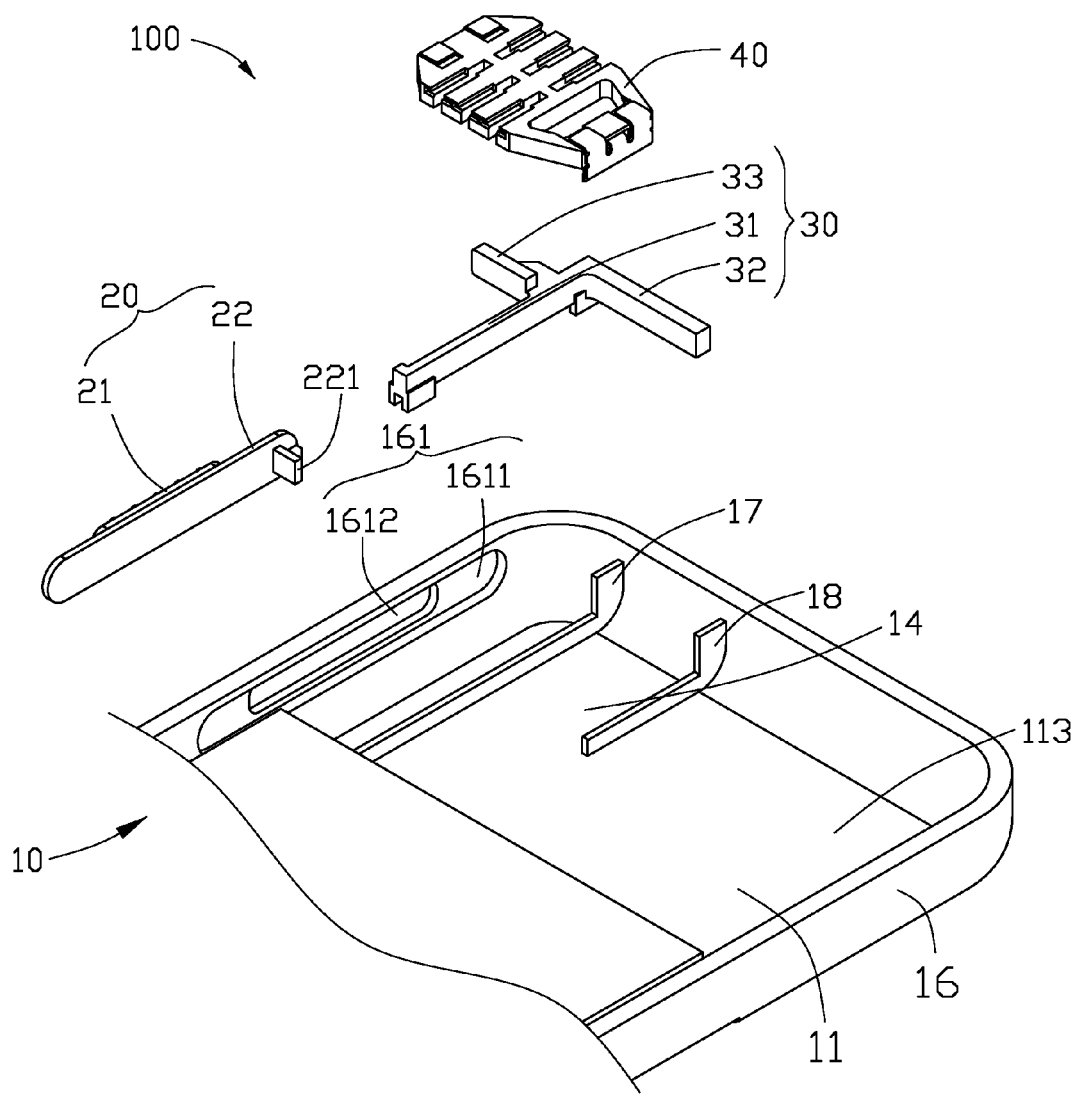
FIG. 1 is an isometric, exploded view of a card socket assembly, in accordance with an exemplary embodiment.
Figure 2:
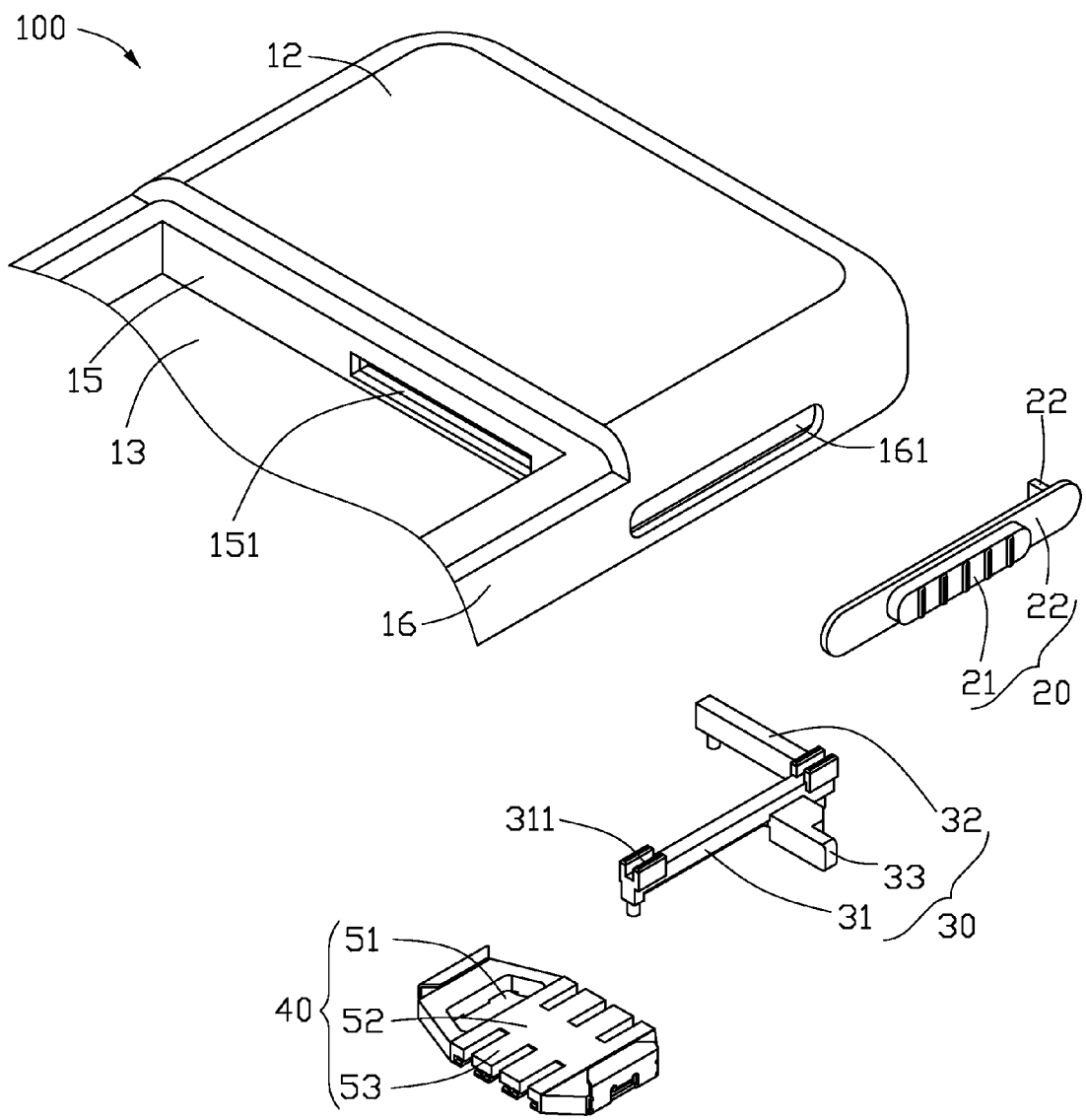
FIG. 2 is similar to FIG. 1, but viewed from another aspect.
Figure 3:
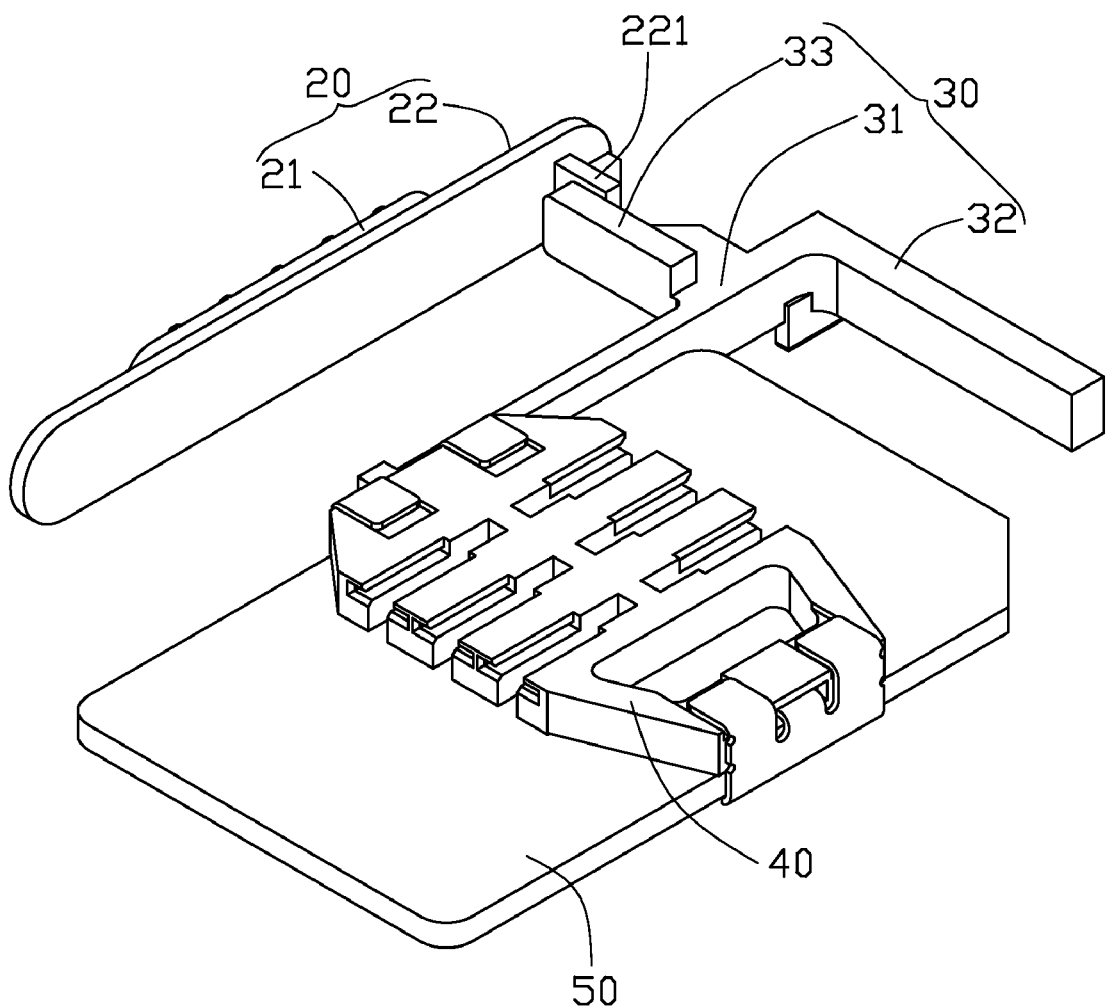
FIG. 3 is an assembled view of the card socket assembly without the body member shown in FIG. 1.
Figure 4:
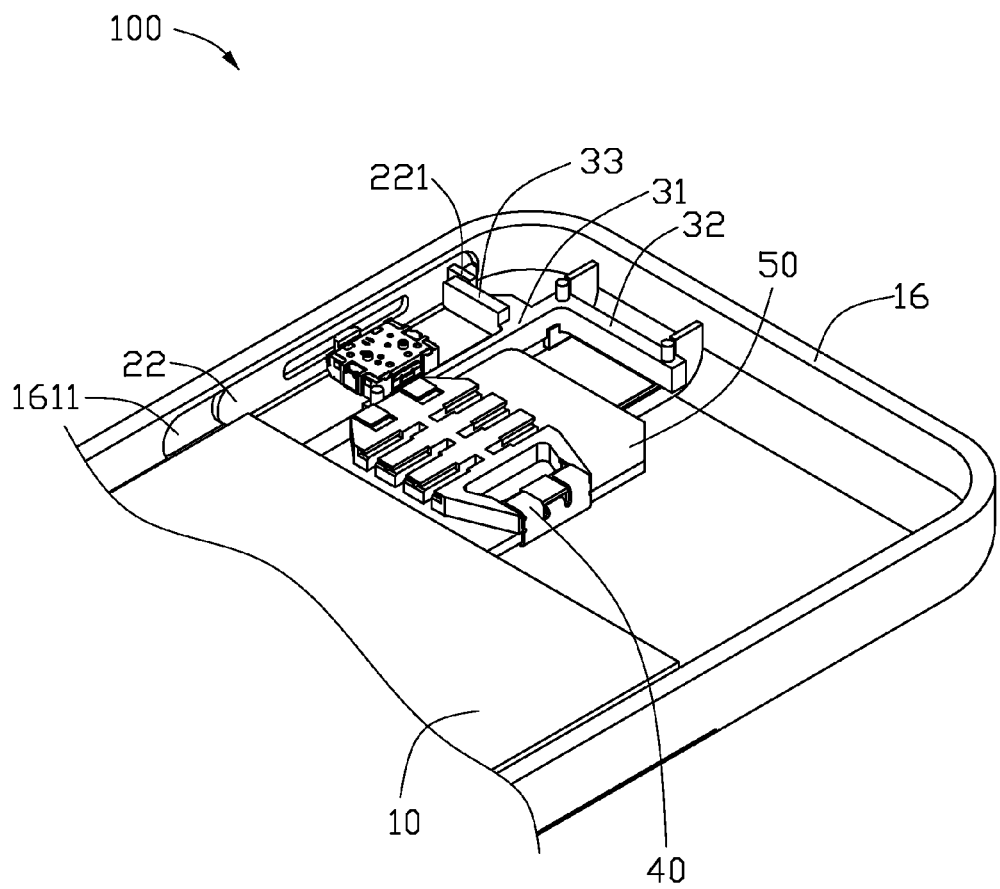
FIG. 4 is an assembled view of the card socket assembly shown in FIG. 1.
Figure 5:
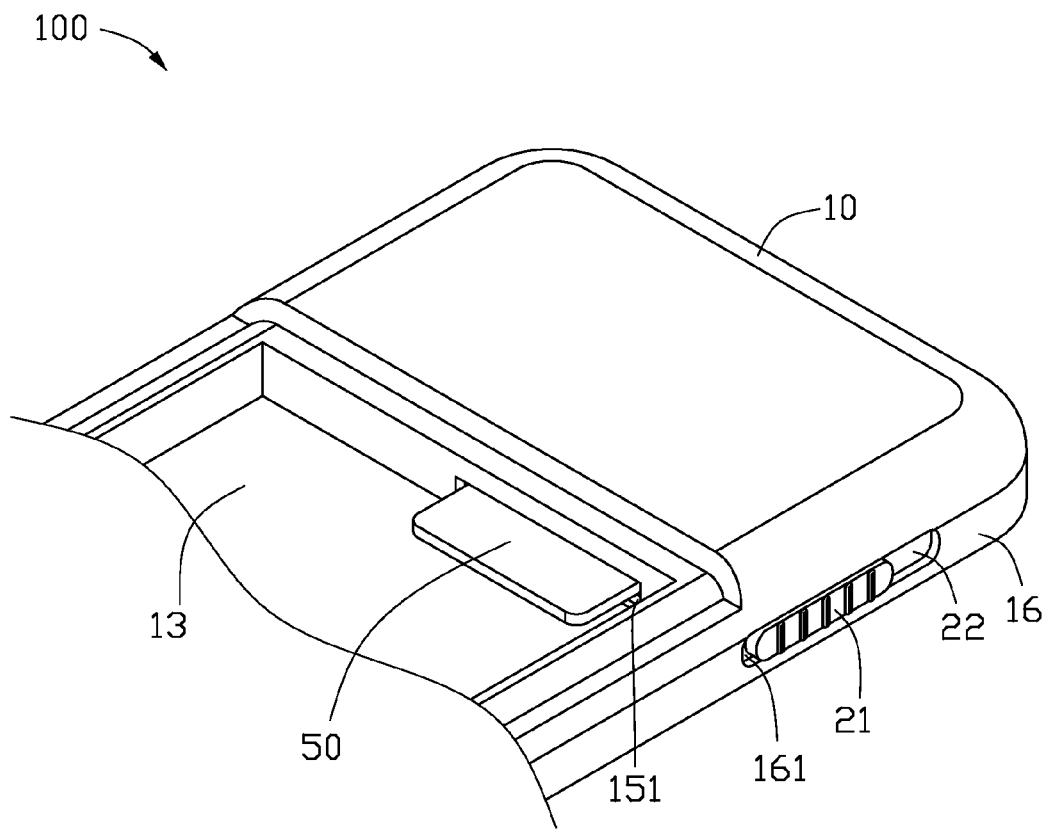
FIG. 5 is a schematic view of the card socket assembly shown in FIG. 1, with a data card taken out.

FIGS. 1 and 2 show an exemplary card socket assembly 100. The card socket assembly 100 includes a body member 10, a button member 20, a controlling member 30, and a connector 40. The button member 20, the controlling member 30 and the connector 40 are mounted to the body member 10.

The body member 10 includes a first surface 11 and a second surface 12 opposite to the first surface 11. The second surface 12 has a recessed receiving battery cavity 13 defined therein. The first surface 11 has a recessed card slot 14 defined therein.

The button member 20 includes an operating portion 21 and a sliding body 22 disposed on the operating portion 21. The operating portion 21 facilitate a user to slide the button member 20. The sliding body 22 is slidably mounted into the sliding channel 1611. The sliding body 22 includes a resisting board 221 protruding from one end thereof away from the battery receiving cavity 13. The resisting board 221 abuts against the controlling member 30.

The controlling member 30 includes a sliding portion 31, a first resisting portion 32, and a second resisting portion 33. The first resisting portion 32 is perpendicularly connected to the sliding portion 31. The second resisting portion 33 protrudes from the sliding portion 31 and away from the first resisting portion 32. The sliding portion 31 defines a sliding slot 311 which receives the sliding bar 17. The first resisting portion 32 is used to eject the data card 50 out of the card slot 14. The second resisting portion 33 is used to resist the resisting board 221 so that the button member 20 drives the controlling member 30 to slide along the sliding channel 1611.

The connector 40 is fastened to the first surface 11 and received in the card slot 14. The connector 40 faces the opening 151 and electrically mounted on a printed circuit board (not shown). The connector 40 includes a base 51 and two arms 52 fastened to both opposite sides of the base 51. The two arms 52 are "L"-shaped, and partially enclose a receiving space 53, used to receive the data card 50.

In assembly, the controlling member 30 is slidably mounted on the sliding bar 17 and the support bar 18. The controlling member 30 is located above the connector 40. The button member 20 is mounted within the mounting portion 161, with the resisting board 221 abutting against the second resisting portion 33. Thus, the card socket assembly 100 has been assembled.

When assembling the data card 50 to the card socket assembly 100, the data card 50 is inserted into the opening 151. Then the data card 50 is further inserted towards the connector 40, driving the controlling member 30 to move together until the data card 50 is completely received in the card slot 14 and electrically connected to the connector 40.

To take out the data card 50 out of the card slot 14, an external force is applied on the operating portion 21 of the button member 20 to drive the controlling member 30 to move towards the opening 151. Thus, the controlling member 30 pushes the data card 50 to advance towards the opening 151 together until the data card 50 is ejected out of the opening 151. At this time, a user can get the data card 50 manually.

The present card socket assembly 100 includes a card slot 14 disposed adjacent to the battery receiving cavity 13, rather than under the battery receiving cavity 13, thus decreasing the thickness of the body member 10.

In other alternative embodiment, the opening 151 may be defined on the wall 16.

In other alternative embodiment, the support bar 18 can be omitted, and the controlling member 30 is slidably mounted to the sliding bar 17 by the sliding portion 31.

In other alternative embodiment, the second resisting portion 33 can be fastened to the resisting board 221, so that the controlling member 30 slides along the sliding channel 1611 together with the button member 20.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A card ejecting mechanism used to eject a data card, the card ejecting mechanism comprising:
    a body member defining a battery receiving space and a card slot adjacent to the battery receiving space, the card slot is used to receive the data card,
    a controlling member slidably mounted to the body member and abutting against the data card,
    a button member slidably mounted to the body member;
    wherein when the button member slides relative to the body member in a first direction, the controlling member slides relative to the body member in the first direction to drive the data card out of the card slot.

2. The card ejecting mechanism as claimed in claim 1, wherein the body member further includes a first surface and a second surface opposite to the first surface, the first surface is recessed towards the second surface to form the battery receiving cavity, the second surface is recessed towards the first surface to form the card slot.

3. The card ejecting mechanism as claimed in claim 2, wherein the body member further includes a sliding bar and a support bar disposed on the first surface and parallel with the first direction, the sliding bar is used to slidably mount the controlling member to the first surface, the support bar is used to support the controlling member.

4. The card ejecting mechanism as claimed in claim 3, wherein the controlling member includes a sliding portion, a first resisting portion, the first resisting portion is perpendicularly connected to the sliding portion, the sliding portion defines a sliding slot which receives the sliding bar, the first resisting portion is used to resist the data card out of the card slot.

5. The card ejecting mechanism as claimed in claim 4, wherein the battery receiving cavity and the card slot are surrounded by a wall, the wall includes a mounting portion with a sliding channel and a through hole, the mounting portion is used to mount the button member.

6. The card ejecting mechanism as claimed in claim 5, the button member includes an operating portion and a sliding body disposed on the operating portion, the operating portion facilitate operation of a user, the sliding body is slidably mounted into the sliding channel, the sliding body includes a resisting board protruding from one end thereof away from the battery receiving cavity, the resisting board abuts against the controlling member.

7. The card ejecting mechanism as claimed in claim 6, wherein the controlling member further includes a second resisting portion, the second resisting portion protrudes from the sliding portion and away from the first resisting portion, the second resisting portion is used to resist the resisting board so that the button member drives the controlling member to slide along the sliding channel.

8. The card ejecting mechanism as claimed in claim 1, wherein the battery receiving cavity and the card slot are separated by a partition, the partition includes an opening communicating with the card slot, the opening allows the data card to be inserted into the card slot.

9. A card ejecting mechanism used to eject a data card, the card ejecting mechanism comprising:
  a body member including a first surface and a second surface opposite to the first surface, the first surface being recessed towards the second surface to form a battery receiving cavity, the second surface being recessed towards the first surface to form a card slot, the card slot is used to receive the data card,
  a controlling member slidably mounted to the body member and abutting against the data card,
  a button member slidably mounted to the body member;
  wherein when the button member slides relative to the body member in a first direction, the controlling member slides relative to the body member in the first direction to drive the data card out of the card slot.

10. The card ejecting mechanism as claimed in claim 9, wherein the battery receiving cavity and the card slot are separated by a partition, the partition includes an opening communicating with the card slot, the opening allows the data card to be inserted into the card slot.

11. The card ejecting mechanism as claimed in claim 9, wherein the body member further includes a sliding bar and a support bar disposed on the first surface and parallel with the first direction, the sliding bar is used to slidably mount the controlling member to the first surface, the support bar is used to support the controlling member.

12. The card ejecting mechanism as claimed in claim 11, wherein the controlling member includes a sliding portion, a first resisting portion, the first resisting portion is perpendicularly connected to the sliding portion, the sliding portion defines a sliding slot which receives the sliding bar, the first resisting portion is used to resist the data card out of the card slot.

13. The card ejecting mechanism as claimed in claim 12, wherein the battery receiving cavity and the card slot are surrounded by a wall, the wall includes a mounting portion with a sliding channel and a through hole, the mounting portion is used to mount the button member.

14. The card ejecting mechanism as claimed in claim 13, the button member includes an operating portion and a sliding body disposed on the operating portion, the operating portion facilitate operation of a user, the sliding body is slidably mounted into the sliding channel, the sliding body includes a resisting board protruding from one end thereof away from the battery receiving cavity, the resisting board abuts against the controlling member.

15. The card ejecting mechanism as claimed in claim 14, wherein the controlling member further includes a second resisting portion, the second resisting portion protrudes from the sliding portion and away from the first resisting portion, the second resisting portion is used to resist the resisting board so that the button member drives the controlling member to slide along the sliding channel.

16. A card ejecting mechanism used to mount eject a data card, the card ejecting mechanism comprising:
  a body member defining a card slot used to receive the data card,
  a controlling member slidably mounted to the body member and locating adjacent to the card slot;
  a button member slidably mounted to the body member;
  wherein when the button member slides relative to the body member in a first direction, the controlling member slides relative to the body member in the first direction to drive the data card out of the card slot.

17. The card ejecting mechanism as claimed in claim 16, wherein the body member further includes a sliding bar parallel with the first direction, the sliding bar is used to slidably mount the controlling member to the body member.

18. The card ejecting mechanism as claimed in claim 17, wherein the controlling member includes a sliding portion, a first resisting portion protruding from the sliding portion, the sliding portion defines a sliding slot which slidably receives the sliding bar therein, the first resisting portion drives the data card out of the card slot when the controlling member slides relative to the body member.

19. The card ejecting mechanism as claimed in claim 16, wherein the button member includes a sliding body and a resisting board protruding from one end thereof, the sliding body is slidably mounted to the body member, the resisting board drives the controlling member slides relative to the body member when the button member slides relative to the body member.

20. The card ejecting mechanism as claimed in claim 19, wherein the controlling member further includes a second resisting portion, the second resisting portion protrudes from the sliding portion and away from the first resisting portion, the second resisting portion is used to resist the resisting board so that the button member drives the controlling member to slide along the sliding channel.

* * * * *